United States Patent
Pereira Da Silva et al.

(10) Patent No.: US 11,702,092 B2
(45) Date of Patent: Jul. 18, 2023

(54) METHOD FOR DETECTING AN OBSTACLE, DETECTION DEVICE, DETECTION SYSTEM AND ASSOCIATED VEHICLE

(71) Applicant: COMMISSARIAT À L'ÉNERGIE ATOMIQUE ET AUX ÉNERGIES ALTERNATIVES, Paris (FR)

(72) Inventors: Alex Pereira Da Silva, Grenoble (FR); Sylvain Leirens, Grenoble (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 247 days.

(21) Appl. No.: 17/070,558

(22) Filed: Oct. 14, 2020

(65) Prior Publication Data
US 2021/0114612 A1    Apr. 22, 2021

(30) Foreign Application Priority Data
Oct. 16, 2019  (FR) ...................................... 1911555

(51) Int. Cl.
*B60W 50/14*  (2020.01)
*B60W 30/09*  (2012.01)
(Continued)

(52) U.S. Cl.
CPC ............ *B60W 50/14* (2013.01); *B60W 30/09* (2013.01); *G06N 7/01* (2023.01); *G06V 20/58* (2022.01); *B60W 2050/143* (2013.01)

(58) Field of Classification Search
CPC ............ B60W 50/14; B60W 2050/143; B60W 30/08; B60W 30/09–0953; B60W 40/04;
(Continued)

(56) References Cited

U.S. PATENT DOCUMENTS 11,002,859 B1 *  5/2021  Zhang .................... G01S 19/48
2009/0299547 A1 * 12/2009  Becker .................. G01S 17/931
                                                                                701/1
(Continued)

OTHER PUBLICATIONS

Thrun, Sebastian "Learning Occupancy Grid Maps With Forward Sensor Models", Autonomous Robots, pp. 1-28 (Year: 2003).*
(Continued)

*Primary Examiner* — Mahmoud Gimie
(74) *Attorney, Agent, or Firm* — Pearne & Gordon LLP

(57) ABSTRACT

A method for detecting an obstacle includes the steps of: calculating, for each point of a space around a telemeter, a plurality of corresponding intermediate probabilities of presence, each intermediate probability of presence being associated with a respective orientation of the telemeter among a plurality of predetermined orientations around a current orientation of the telemeter, each orientation being certain; for each point of space, calculating a probability of the presence of an obstacle from each corresponding intermediate probability of presence and from an uncertainty model on the orientation of the telemeter; and generating an alert if the probability of the presence of an obstacle in a predetermined zone with respect to the telemeter is greater than or equal to a predetermined alert threshold.

12 Claims, 3 Drawing Sheets

(51) Int. Cl.
*G06V 20/58* (2022.01)
*G06N 7/01* (2023.01)

(58) Field of Classification Search
CPC ........ G06V 20/54; G06V 20/56; G06V 20/58; G01S 17/93–931
USPC ........................................................ 701/301
See application file for complete search history.

(56) References Cited

U.S. PATENT DOCUMENTS

| | | | |
|---|---|---|---|
| 2012/0316723 | A1* | 12/2012 | Sans Sangorrin ... G06V 20/586 701/23 |
| 2016/0110162 | A1 | 4/2016 | Bartlett et al. |
| 2017/0331577 | A1* | 11/2017 | Parkvall ............... H04J 11/0079 |
| 2018/0058870 | A1* | 3/2018 | Gaebler ................. G08G 1/093 |
| 2019/0110272 | A1 | 4/2019 | Pereira Da Silva et al. |
| 2019/0250238 | A1 | 8/2019 | Leirens |
| 2019/0293678 | A1 | 9/2019 | Leirens |
| 2019/0318177 | A1* | 10/2019 | Steinberg ................ G01S 17/58 |
| 2020/0284671 | A1 | 9/2020 | Leirens |
| 2020/0284883 | A1* | 9/2020 | Ferreira ................ G01S 7/4817 |
| 2021/0309254 | A1* | 10/2021 | Murahashi ......... B60W 60/0011 |
| 2021/0339741 | A1* | 11/2021 | Rezvan Behbahani ...................... B60W 40/04 |
| 2022/0083077 | A1* | 3/2022 | Pereira Da Silva . G06K 9/6288 |

OTHER PUBLICATIONS

Preliminary French Search Report for French application No. 1911555 dated Jun. 24, 2020.
Yuan, Shuai et al. "DSmT-Based Ultrasonic Detection Model for Estimating Indoor Environment Contour" In: IEE Transactions on Instrumentation and Measurement, Sep. 25, 2019, vol. 69, No. 7, pp. 4002-4014.
Thrun, Sebastian "Learning Occupancy Grid Maps With Forward Sensor Models" In: Autonomous Robots, Sep. 1, 2003, pp. 1-28.

* cited by examiner

METHOD FOR DETECTING AN OBSTACLE, DETECTION DEVICE, DETECTION SYSTEM AND ASSOCIATED VEHICLE

CROSS-REFERENCE TO RELATED APPLICATIONS

This application claims priority from French Patent Application No. 1911555 filed on Oct. 16, 2019. The entire content of this application is incorporated herein by reference in its entirety.

TECHNICAL FIELD

The present invention relates to a computer-implemented method for detecting an obstacle. The invention also relates to a detection device, a detection system comprising such a detection device, and a vehicle embedding such a detection system.

The invention relates to the field of telemetry, in particular to the detection of obstacle(s) by means of a telemeter.

PRIOR ART

It is known to equip a vehicle with at least one telemeter for determining the presence of obstacle(s) in an environment around the vehicle.

Having recourse to such a telemeter has its application in the construction of maps of the probability of the presence of obstacles, pertinent in the field of safety as it allows for the detection of obstacles, collision prediction or improving the safety of vulnerable users (pedestrians, bicycles, etc.).

More precisely, it is known to develop a map of the probability of the presence of an obstacle from detection data representative of the presence or not of an obstacle along each one among the detection axes associated with the telemeter. Such a map represents not only the probability of the presence of an obstacle along each detection axis, but also the probability of the presence of an obstacle between the detection axes.

However, the known methods for detecting obstacles are not entirely satisfactory.

The implementation of the known methods results in a high degree of calculation complexity, in particular due to the implementation of occupancy grids that require the determination of the position of the intersections between each cell of the occupancy grid and the detection axes.

Furthermore, taking account of the uncertainties on the position and the orientation of the telemeter for developing the map of the probability of the presence of an obstacle further increases the complexity of the calculations.

A purpose of the invention is therefore to propose a method for detecting an obstacle that makes it possible to develop a presence probability map with a reduced calculation complexity and with a high resolution, while still taking the position and orientation uncertainties of the telemeter into account.

DISCLOSURE OF THE INVENTION

For this purpose, an object of the invention is a detection method of the aforementioned type, including, for at least one telemeter having a plurality of detection axes, from a current position of the telemeter, of an uncertainty model on the position of the telemeter and of a detection signal delivered by the telemeter, the detection signal being indicative of the position, along each detection axis, of a corresponding detection horizon, the steps of:

calculating, for each point of a space around the telemeter, a plurality of corresponding intermediate probabilities of presence, each intermediate probability of presence being associated with a respective orientation of the telemeter among a plurality of predetermined orientations around a current orientation of the telemeter, each orientation being certain;

for each point of space, calculating a probability of the presence of an obstacle from each corresponding intermediate probability of presence and from an uncertainty model on the orientation of the telemeter;

generating an alert if the probability of the presence of an obstacle in a predetermined zone with respect to the telemeter is greater than or equal to a predetermined alert threshold.

Indeed, through the implementation of a calculation of the intermediate presence probabilities, the uncertainty on the measurement of the orientation of the telemeter not being taken into account, then of the calculation of the probability of the presence of an obstacle from the intermediate probabilities, the calculation complexity is greatly reduced in relation to the known methods for detecting obstacles.

Thus, the method of the invention allows for an increase in the resolution of the map of the probability of the presence of an obstacle with respect to the known methods for detecting obstacles, without any detrimental impact on the calculation time required to establish such a map.

According to other advantageous aspects of the invention, the detection method includes one or more of the following characteristics, taken individually or in any technically possible combinations:

for any given point of space, the probability of the presence of an obstacle is proportional to a weighted sum of the corresponding intermediate probabilities, a weighting factor associated with each intermediate probability being equal to a probability of the corresponding orientation;

for any given point of space, the probability of the presence of an obstacle is equal to:

$$P(x, y) = \frac{\sum_{l=L}^{L} h(\beta_l) P^{\beta_l}(x, y)}{\sum_{l=L}^{L} h(\beta_l)}$$

where P(x, y) is the probability of the presence of an obstacle at the point having coordinates (x, y);

$\beta_l$ is the l-th orientation of the telemeter among 2L+1 predetermined orientations around the current orientation;

$h(\beta_l)$ is the probability that the telemeter has the orientation $\beta_l$ knowing the current orientation; and $P^{\beta_l}(x,y)$ is the intermediate probability of presence at the point having coordinates (x,y), for the orientation $\beta_l$ of the telemeter;

the uncertainty model on the orientation of the telemeter implements the law of probability:

$$h(\beta) = \begin{cases} \frac{1}{\sigma_\beta \sqrt{2\pi} \operatorname{erf}\left(\frac{\pi}{\sqrt{2}\sigma_\beta}\right)} \exp\left[-\frac{1}{2\sigma_\beta^2}(\beta-\mu_\beta)^2\right], & \text{if } -\pi \leq \beta < \pi \\ 0, & \text{otherwise} \end{cases}$$

where $h(\beta)$ is the probability that the telemeter has any given orientation $\beta$;

$\sigma_\beta$ is a standard deviation of a measurement of the orientation of the telemeter;
$\mu_\beta$ is the current orientation of the telemeter;
"erf" is the error function; and
"exp" is the exponential function;
the detection axes come from the same emission point of the telemeter, the detection axes being contained in an angular detection sector, the method comprising estimating the position of each point of a detection front defined in the angular detection sector and intercepting each detection horizon;
the detection method implements a detection model of the form:

$$f_i(r \mid \theta) = \begin{cases} u(r - d(\theta) + \tau) - \frac{1}{2} u(r - d(\theta) - \tau), & \text{if } d_i \text{ or/and } d_{i+1} < d_R - \tau \\ \frac{1}{2} u(r - d_R + \tau), & \text{if } d_i \text{ and } d_{i+1} \geq d_R - \tau \end{cases}$$

where $f_i(r \mid \theta)$ is the probability of detecting an obstacle at a distance r and according to an angular coordinate $\theta$ comprised between angles $\theta_i$ and $\theta_{i+1}$ associated with two successive detection axes, the position and the orientation of the telemeter being certain;
$d_i$, respectively $d_{i+1}$, is the position, along the detection axis associated with the angle $\theta_i$, respectively $\theta_{i+1}$, of the corresponding detection horizon;
$d_R$ is the range of the telemeter;
$\tau$ is the uncertainty on the measurement, by the telemeter, of the position of the detection horizon;
"u" is the unit step function; and
$d(\theta)$ is the position of the detection front for the angular coordinate $\theta$;
the intermediate probability of presence at any given point, for a given orientation of the telemeter, is evaluated from the expression:

$$P^\beta(x, y) = \sum_{i \in F_\geq} A_i(x, y) + \sum_{i \in F_<} B_i(x, y) + C(x, y)$$

where $P^\beta(x,y)$ is the intermediate probability of presence at the point having coordinates (x,y), for the orientation $\beta$ of the telemeter;
$F_\geq$ is all the successive pairs of detection axes, associated respectively with angles $\theta_i$ and $\theta_{i+1}$, for which the positions of the respective detection horizons $d_i$ and $d_{i+1}$ are simultaneously greater than or equal to $d_R - \tau$;
$F_<$ is all the successive pairs of detection axes, associated respectively with angles $\theta_i$ and $\theta_{i+1}$, for which the position of at least one of the respective detection horizons $d_i$ and $d_{i+1}$ is strictly less than $d_R - \tau$;
$A_i(x,y)$ is a function defined as:

$$A_i(x, y) = \frac{1}{4\pi\sigma^2} \int_{\theta_i}^{\theta_{i+1}} Y(x, y, r, \theta \mid d_R - \tau \to D) d\theta$$

$B_i(x,y)$ is a function defined as:

$$B_i(x, y) = \frac{1}{2\pi\sigma^2} \int_{\theta_i}^{\theta_{i+1}} \left( Y(x, y, r, \theta; d(\theta) - \tau \to d(\theta) + \tau) + \frac{1}{2} Y(x, y, r, \theta; d(\theta) + \tau \to D) \right) d\theta$$

$C(x,y)$ is a function defined as:

$$C(x, y) = \frac{1}{4\pi\sigma^2} \int_{\Gamma(\beta)} Y(x, y, r, \theta \mid 0 \to D) d\theta$$

where:

$$Y(x, y, r, \theta, ; \lambda \to \mu) =$$

$$l_1(x, y, \mu, \theta) - l_1(x, y, \lambda, \theta) + l_2(x, y, \mu, \theta) - l_2(x, y, \lambda, \theta)$$

with:

$$l_1(x, y, r, \theta) = -\sigma^2 \exp\left\{-\frac{1}{2\sigma^2}[r^2 + 2rq(x, y, \theta) + w(x, y)]\right\}$$

and:

$$l_2(x, y, r, \theta) = -\frac{\sqrt{2\pi}}{2} \sigma q(x, y, \theta) \text{erf}\left[\frac{r + q(x, y, \theta)}{\sqrt{2}\sigma}\right] \exp\left\{-\frac{1}{2\sigma^2} m(x, y, \theta)^2\right\}$$

$\sigma$ is a standard deviation of a measurement of the position of the telemeter;
D is a predetermined axial limit;
$w(x, y)$ is a quantity equal to $(x-\mu_x)^2 + (y-\mu_y)^2$
$q(x, y, \theta)$ is a quantity equal to $(x-\mu_x)\cos\theta + (y-\mu_y)\sin\theta$
$m(x, y, \theta)$ is a quantity equal to $(x-\mu_x)\sin\theta - (y-\mu_y)\cos\theta$
$(\mu_x, \mu_y)$ are coordinates that represent the current position of the telemeter; and
$\Gamma(\beta)$ is a complementary angular sector of an angular detection sector containing the detection axes of the telemeter, the telemeter having the orientation $\beta$;
the axial limit is equal to:

$$D = \frac{\varepsilon}{2 \sin\frac{\Delta\theta}{2}}$$

where $\varepsilon$ is a maximum difference desired between two consecutive detection axes;
$\Delta\theta$ is the largest angle between two consecutive detection axes.

Furthermore, an object of the invention is a computer program product comprising program code instructions which, when executed by a computer, implement the detection method as defined hereinabove.

Another object of the invention is a device for detecting an obstacle configured in such a way as to, for at least one telemeter having a plurality of detection axes, from a current position of the telemeter, of an uncertainty model on the position of the telemeter and of a detection signal delivered by the telemeter, the detection signal being indicative of the position, along each detection axis, of a corresponding detection horizon:
  calculate, for each point of a space around the telemeter, a plurality of corresponding intermediate probabilities of presence, each intermediate probability of presence being associated with a respective orientation of the telemeter among a plurality of predetermined orientations around a current orientation of the telemeter, each orientation being certain;
  for each point of space, calculate a probability of the presence of an obstacle from each corresponding intermediate probability of presence and from an uncertainty model on the orientation of the telemeter;
  generate an alert if the probability of the presence of an obstacle in a predetermined zone with respect to the telemeter is greater than or equal to a predetermined alert threshold.

Another object of the invention is a detection system comprising a device for detecting an obstacle as defined hereinabove, a telemeter and a navigation device, the telemeter being associated with a plurality of detection axes and being configured to deliver a detection signal indicative of the position, along each detection axis, of a corresponding detection horizon, the navigation device being configured to determine the current position and the current orientation of the telemeter, the detection device being connected to the telemeter to receive the detection signal and to the navigation device to receive the current position and the current orientation of the telemeter.

Another object of the invention is a vehicle embedding a system for detecting an obstacle as defined hereinabove, the detection axes of the telemeter being directed towards the outside of the vehicle.

BRIEF DESCRIPTION OF THE DRAWINGS

The invention shall be better understood using the following description, provided solely as a non-limiting example and given in reference to the accompanying drawings wherein.

DETAILED DESCRIPTION

Figure 1:
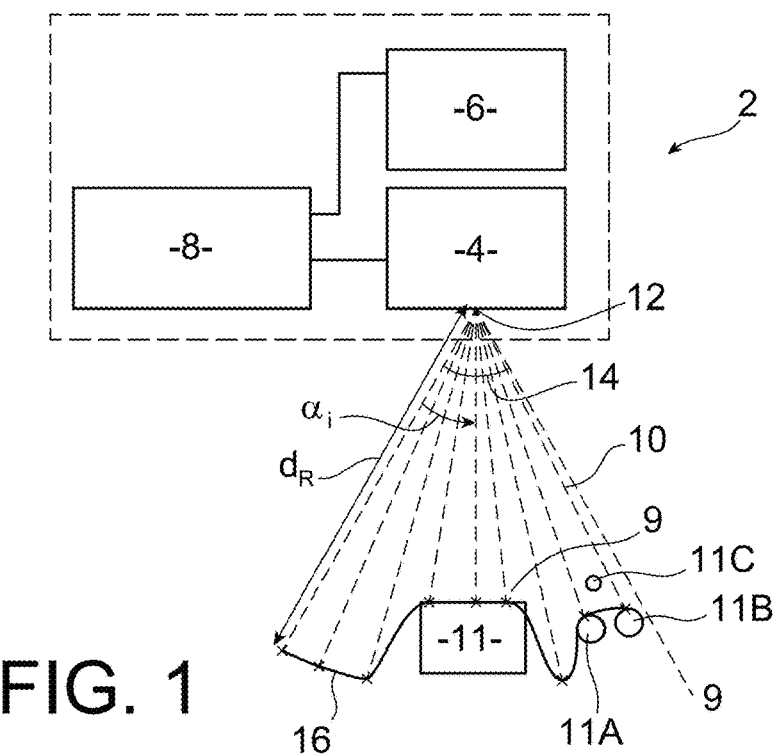
FIG. 1 diagrammatically shows a system for detecting an obstacle according to the invention.

A system 2 for detecting an obstacle according to the invention is shown in FIG. 1.

The detection system 2 is intended to be embedded in a vehicle, for example a car.

The detection system 2 is configured to calculate, in a given scene, a map of the probability of the presence of an obstacle, for example in at least one plane of the scene.

The detection system 2 is also configured to generate an alert in the case where the probability of the presence of an obstacle in a predetermined zone is greater than or equal to a predetermined alert threshold.

The map of the probability of the presence of an obstacle is a two- or three-dimensional map. In the following detailed example, the map of the probability of the presence of an obstacle is a flat map, contained in the plane (XΩY) as it appears in FIG. 2.

As it appears in FIG. 1, the detection system 2 comprises a telemeter 4, a navigation device 6 and a device 8 for detecting an obstacle.

The telemeter 4 is associated with a plurality of detection axes 10 which, in the case of an embedded application, are directed towards the outside of the vehicle.

At least part of the detection axes 10 are coplanar, from the same emission point 12 of the telemeter 4 and are contained in an angular detection sector 14. For example all the detection axes 10 are coplanar.

The detection axes 10 that are coplanar and from the same emission point 12 are also called a "web".

Each detection axis 10 of the same web is advantageously identified by a corresponding angle $\alpha_i$, measured with respect to a predetermined straight reference line, i being a natural integer comprised between 1 and N, N being the number of detection axes 10 of the same web. The angle $\alpha_i$, for example, increases with the value of i.

Furthermore, the telemeter 4 is configured to emit an interrogation wave along each detection axis 10. The telemeter 4 is also configured to deliver a detection signal indicative of the position, along each detection axis 10, of a corresponding detection horizon 9 detected thanks to the interrogation wave.

"Position of the detection horizon" along a detection axis 10 means, in the present invention:

in the case where an obstacle 11, able to reflect and/or backscatter at least partially the interrogation wave, is present on the path of the latter at a distance less than a range $d_R$ of the telemeter 4, the position of the obstacle 11 along the detection axis 10; and in the absence of such an obstacle, the position of the point that is, along the detection axis 10, at a distance equal to the range of the telemeter 4.

In FIG. 1, for each detection axis 10, the corresponding detection horizon 9 is represented by a cross.

For each detection axis 10, identified by its angle $\alpha_i$, the distance between the corresponding detection horizon 9 and the emission point 12 is noted $d_i$.

The telemeter 4 is conventionally known. The telemeter 4 is, for example, a LIDAR (acronym for "Light Detection And Ranging"), a RADAR (acronym for "RAdio Detection And Ranging") or a SONAR (acronym for "SOund Navigation and Ranging") device.

In the case of an embedded application, the telemeter 4 is fixed in relation to the vehicle.

Figure 2:
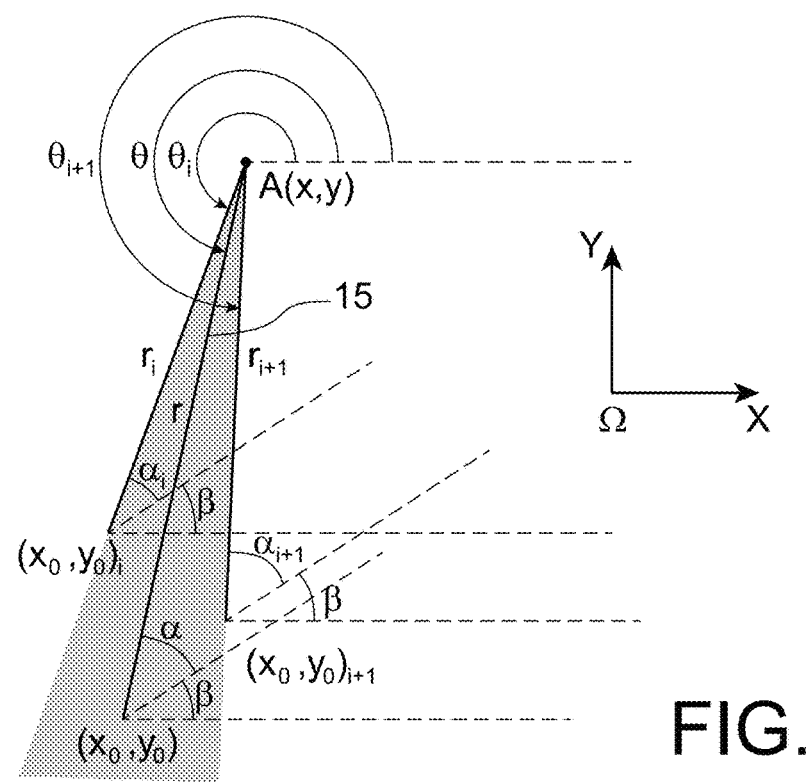
FIG. 2 diagrammatically shows the coordinate systems used for the implementation, by the detection system of FIG. 1, of the detection method according to the invention.

The navigation device 6 is configured to determine the current position and the current orientation of the telemeter 4 in a predetermined referential frame, for example the earth reference frame. As shown in FIG. 2, the predetermined reference frame is associated with a Cartesian coordinate system of origin, one point Ω, and axes (ΩX) and (ΩY).

The navigation device 6 is conventionally known. For example, the navigation device 6 comprises a satellite positioning member (also designated by the acronym GNSS (Global Navigation Satellite System), configured to determine the position of the telemeter, and an inertial navigation station, configured to determine the orientation of the telemeter.

"Orientation of the telemeter" means, in the present invention, the orientation of a fixed straight line in relation to telemeter 4 (for example, the reference straight line) in the predetermined referential frame, i.e. an angle formed by the fixed straight line and a given axis of the Cartesian coordinate system. Preferably, such a straight line is parallel to a web of detection axes 10.

The position of the telemeter 4 determined by the navigation device 6, referred to as "current position", is noted ($\mu_x$, $\mu_y$), in the Cartesian coordinate system. Furthermore, in this coordinate system, any position of the telemeter is noted ($x_0$, $y_0$).

The orientation of the telemeter 4 determined by the navigation device 6, referred to as "current orientation", is noted $\mu_\beta$. Furthermore, any orientation is noted $\beta$.

Each one of the measurement of the position of the telemeter 4 and the measurement of the orientation of the telemeter 4 is marred by error. A model for the error on the position measurement and a model for the error on the orientation measurement shall be described hereinafter.

The detection device 8 comprises, in particular, a calculator for performing the calculations described hereinafter. The device 8 is connected to the telemeter 4 to receive the detection signal, and to the navigation device 6 to receive the current position and the current orientation of the telemeter 4 determined by said navigation device 6.

The detection device 8 is configured to calculate the map of the probability of the presence of an obstacle from a detection signal coming from the telemeter 4 and information with respect to the current position and orientation of the telemeter 4 provided by the navigation device 6.

In particular, the detection device 8 is configured to, firstly, calculate, for each point of a space around the telemeter 4, a plurality of corresponding intermediate probabilities of presence, from the current position of the telemeter 4, an uncertainty model on the position of the telemeter 4 and the detection signal.

More precisely, each intermediate probability of presence is associated with a respective orientation of the telemeter 4 among a plurality of predetermined orientations around the current orientation of the telemeter 4. For such a calculation, each predetermined orientation is certain, i.e. considered as not marred by error. Recourse to such a plurality of predetermined orientations aims to take account of the fact that the measurement of the orientation of the telemeter 4, provided by the navigation device 6, is uncertain. In other words, each one of the predetermined orientations around the current position of the telemeter 4, measured by the navigation device 6, is an orientation likely to effectively be adopted by the telemeter 4. Such an approach provides the method for detecting obstacles according to the invention with less complexity than that of the conventional methods, as shall be shown hereinafter.

Furthermore, the detection device 8 is configured to then calculate, for each point of space, the probability of the presence of an obstacle from each corresponding intermediate probability of presence and from an uncertainty model on the orientation of the telemeter 4.

The detection device 8 is also configured to generate the alert described hereinabove, when the probability of the presence of an obstacle in a predetermined zone with respect to the telemeter 4 is greater than or equal to the predetermined alert threshold.

FIG. 2 shows a second coordinate system implemented by the detection device 8 in order to perform the calculations described hereinabove. Such a coordinate system is a polar coordinate system, of which the origin is any point A for which the probability of the presence of an obstacle has to be determined.

The coordinates of point A are (x, y) in the Cartesian coordinate system.

In a polar coordinate system, any straight line 15 passing through point A is identified by an angle $\theta$, that satisfies the relationship: $\theta = \alpha + \beta + 180°$, $\alpha$ being the angle between the reference straight line linked to the telemeter 4 and the straight line 15, $\beta$ being the considered value of the orientation of the telemeter 4. In particular, for any given orientation $\beta$, the angle $\theta_i$ is $\alpha_i + \beta + 180°$.

The uncertainty model on the position of the telemeter 4 implements a law of probability that is expressed, in such a coordinate system, as:

$$g(r, \theta \mid x, y) = \frac{1}{2\pi\sigma^2} \exp\left[-\frac{1}{2\sigma^2}\left((x + r\cos\theta - \mu_x)^2 + (y + r\sin\theta - \mu_y)^2\right)\right]$$

where $g(r,\theta|x,y)$ is the probability that the telemeter has any position given by the polar coordinates $(r,\theta)$ in the polar coordinate system centred on point A of coordinates (x, y);

$\sigma$ is a standard deviation of the measurement of the position of the telemeter 4; and "exp" is the exponential function.

Furthermore, the uncertainty model on the orientation of the telemeter 4 implements the law of probability:

$$h(\beta) = \begin{cases} \dfrac{1}{\sigma_\beta\sqrt{2\pi}\,\mathrm{erf}\left(\dfrac{\pi}{\sqrt{2}\,\sigma_\beta}\right)} \exp\left[-\dfrac{1}{2\sigma_\beta^2}(\beta - \mu_\beta)^2\right], & \text{if } -\pi \leq \beta < \pi \\ 0, & \text{otherwise} \end{cases}$$

where $h(\beta)$ is the probability that the telemeter has any given orientation $\beta$;

$\sigma_\beta$ is a standard deviation of the measurement of the orientation of the telemeter 4; and "erf" is the error function.

For the calculation of the intermediate probabilities, the detection device 8 is configured to estimate the position of each point of a detection front 16, shown in FIG. 1 and defined in the angular detection sector 14 and intercepting each detection horizon 9.

In particular, the detection device 8 is configured to determine the position of the detection front 16 by means of an interpolation, for example a linear interpolation or a polynomial interpolation.

Preferably, the position $d(\theta)$ of any point of the detection front 16, identified by its angle $\theta$, is given by the general expression:

$$d(\theta) = \sum_{i=1}^{N-1} d^{(i)}(\theta) \chi_{\Theta_i}(\theta)$$

where $\chi_{\Theta_i}(\theta)$ is an indicating function defined as:

$$\chi_{\Theta_i}(\theta) = \begin{cases} 1, & \text{if } \theta \in \Theta_i \\ 0, & \text{if } \theta \notin \Theta_i \end{cases}$$

$\Theta_i$ is an angular interval defined as:

$\Theta_i = \{\theta: \theta_i \leq \theta < \theta_{i+1}\}, i=1, \ldots, N-2$, and $\Theta_{N-1} = \{\theta: \theta_{N-1} \leq \theta \leq \theta_N\}$; and $d^{(i)}(\theta)$ is the interpolation function between the position of the two detection horizons 9 associated respectively with the limits of the angular interval $\Theta_i$. In other words, $d^{(i)}(\theta)$ is the interpolation function between the positions of the detection horizons 9 associated respectively with the detection axes 10 identified by the angles $\theta_i$ and $\theta_{i+1}$.

For example, in the case of a linear interpolation, the interpolation function $d^{(i)}(\theta)$ is expressed as:

$$d^{(i)}(\theta) = \frac{(\theta_{i+1} - \theta)d_i + (\theta - \theta_i)d_{i+1}}{\theta_{i+1} - \theta_i}$$

The detection device 8 is also configured to calculate each intermediate probability by implementing a detection model that has, preferably, the form:

$$f_i(r \mid \theta) = \begin{cases} u(r - d(\theta) + \tau) - \frac{1}{2}u(r - d(\theta) - \tau), & \text{if } d_i \text{ or/and } d_{i+1} < d_R - \tau \\ \frac{1}{2}u(r - d_R + \tau), & \text{if } d_i \text{ and } d_{i+1} \geq d_R - \tau \end{cases}$$

where i is comprised between 1 and N−1;

$f_i(r|\theta)$ is the probability of detecting an obstacle at a distance r and according to an angle θ comprised between the angles $\theta_i$ and $\theta_{i+1}$;

$d_i$, respectively $d_{i+1}$, is the position, along the detection axis associated with the angle $\theta_i$, respectively $\theta_{i+1}$, of the corresponding detection horizon;

$d_R$ is the range of the telemeter;

τ is the uncertainty on the measurement, by the telemeter, of the position of the detection horizon; and "u" is the unit step function.

In such a detection model, the position and the orientation of the telemeter 4 are considered to be certain.

Figure 3:
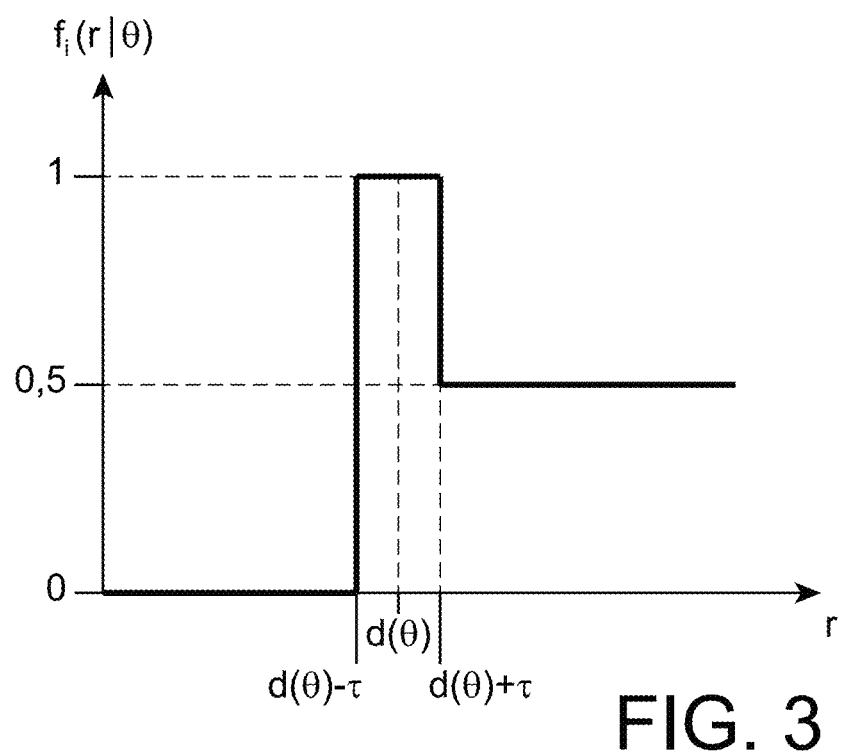
FIG. 3 is a graph showing the change in an example of a function of the probability of the presence of an obstacle as a function of the distance with respect to a telemeter of the system for detecting an obstacle of FIG. 1, with a detection horizon located at a distance less than a range of said system for detecting an obstacle.

A first implementation of the detection model is shown in FIG. 3.

In this example, any considered straight line 15 (see FIG. 2) passing through the point having coordinates (x, y) and identified by an angle θ comprised between any two successive angles $\theta_i$ and $\theta_{i+1}$ associated with detection axes 10 of the telemeter 4.

For this straight line 15, the detection front 16 is located at a distance d(θ) less than the distance $d_R$−τ. Furthermore, at least one among the position $d_i$ of the detection horizon 9 for the angle $\theta_i$ and the position $d_{i+1}$ of the detection horizon 9 for the angle $\theta_{i+1}$ is strictly less than the distance $d_R$−τ.

In this case, along the straight line 15, the probability of occupation is:

zero (or set to a very small value before 1) for the values of r strictly less than the position d(θ)−τ;

equal to 1 (or very close to 1), at the detection front 16, i.e. between d(θ)−τ and d(θ)+τ; and equal to 0.5 beyond the detection front 16, i.e. from the position d(θ)+τ along the straight line 15.

Figure 4:
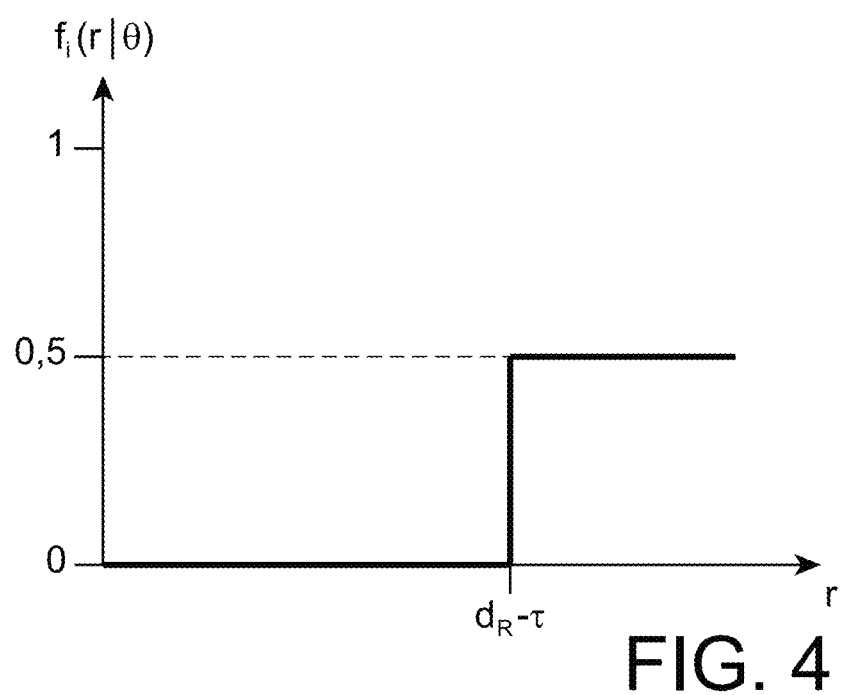
FIG. 4 is similar to FIG. 3, the detection horizon being located at a distance equal to the range of the system for detecting an obstacle.

A second implementation of the detection model is shown in FIG. 4.

This example differs from the example of FIG. 3 only in that the detection front 16 is located at a distance d(θ) greater than or equal to the distance $d_R$−τ.

In this case, along the straight line 15, the probability of occupation is:

zero (or set to a very small value before 1) for the values of r strictly less than the position $d_R$−τ; and equal to 0.5 beyond the range of the telemeter 4, i.e. from the position $d_R$−τ along the straight line 15.

The preceding results in that the value "0.5" reveals an unknown region, for example a region located behind an obstacle.

A situation similar to that of FIG. 4 also occurs when, for a straight line 15 associated with an angle θ comprised between $\theta_i$ and $\theta_{i+1}$, the position $d_i$ of the detection horizon 9 for the angle $\theta_i$ and the position $d_{i+1}$ of the detection horizon 9 for the angle $\theta_{i+1}$ are simultaneously greater than or equal to the distance $d_R$−τ.

The detection device 8 is also configured to calculate, for a any given point having coordinates (x, y), and for any given orientation β (in particular, any orientation β among 2L+1 orientations centred around $\mu_\beta$), the intermediate probability of presence from the expression (1):

$$P^\beta(x, y) = \sum_{i \in F_\geq} A_i(x, y) + \sum_{i \in F_<} B_i(x, y) + C(x, y) \quad (1)$$

where $P^\beta(x,y)$ is the intermediate probability of presence at the point having coordinates (x, y), for the orientation β of the telemeter;

$F_\geq$ is all the successive pairs of detection axes 10, associated respectively with angles $\theta_i$ and $\theta_{i+1}$, for which the positions of the respective horizons $d_i$ and $d_{i+1}$ are simultaneously greater than or equal to $d_R$+τ;

$F_<$ is all the successive pairs of detection axes, associated respectively with angles $\theta_i$ and $\theta_{i+1}$, for which the position of at least one of the respective horizons $d_i$ and $d_{i+1}$ is strictly less than $d_R$−τ;

$$A_i(x, y) = \frac{1}{4\pi\sigma^2} \int_{\theta_i}^{\theta_{i+1}} Y(x, y, r, \theta \mid d_R - \tau \to D)d\theta$$

$$B_i(x, y) = \frac{1}{2\pi\sigma^2} \int_{\theta_i}^{\theta_{i+1}} \left( Y(x, y, r, \theta; d(\theta) - \tau \to d(\theta) + \tau) + \frac{1}{2} Y(x, y, r, \theta; d(\theta) + \tau \to D) \right) d\theta$$

$$C(x, y) = \frac{1}{4\pi\sigma^2} \int_{\Gamma(\beta)} Y(x, y, r, \theta \mid 0 \to D)d\theta$$

$$Y(x, y, r, \theta; \lambda \to \mu) = I_1(x, y, \mu, \theta) - I_1(x, y, \lambda, \theta) + I_2(x, y, \mu, \theta) - I_2(x, y, \lambda, \theta)$$

$$I_1(x, y, r, \theta) = -\sigma^2 \exp\left\{ -\frac{1}{2\sigma^2}[r^2 + 2rq(x, y, \theta) + w(x, y)] \right\}$$

$$I_2(x, y, r, \theta) = -\frac{\sqrt{2\pi}}{2}\sigma q(x, y, \theta) \, \text{erf}\left[ \frac{r + q(x, y, \theta)}{\sqrt{2}\sigma} \right] \exp\left\{ -\frac{1}{2\sigma^2}m(x, y, \theta)^2 \right\}$$

σ is a standard deviation of a measurement of the position of the telemeter;

D is a predetermined axial limit;

w(x,y) is a quantity equal to $(x-\mu_x)^2+(y-\mu_y)^2$;

q(x,y,θ) is a quantity equal to $(x-\mu_x)\cos\theta+(y-\mu_y)\sin\theta$;

m(x,y,θ) is a quantity equal to $(x-\mu_x)\sin\theta-(y-\mu_y)\cos\theta$; and

Γ(β) is a complementary angular sector of an angular detection sector containing the detection axes of the telemeter, the telemeter having the orientation β.

More precisely, the detection device 8 is configured to obtain each intermediate probability via an approximated calculation of the relationship (1). In particular, the detection device 8 is configured to numerically integrate, along θ, the functions $l_1(x,y,r,\theta)$ and $l_2(x,y,r,\theta)$ by applying, for example, the trapezoidal rule for each angular interval $[\theta_i; \theta_{i+1}]$ and on Γ(β), in such a way as to obtain an approximated solution for $A_i(x,y)$, $B_i(x,y)$ and $C(x,y)$. Alternatively, a linear approximation is carried out on the trigonometric functions $\cos\theta$ and $\sin\theta$ implemented in the functions $l_1(x,y,r,\theta)$ and $l_2(x,y,r,\theta)$ in such a way as to obtain an analytical solution for such a calculation of integrals: this has for advantageous effect to reduce the numerical complexity of the calculation.

Such an expression (1) for the intermediate probability of presence $P^\beta(x,y)$ at the point having coordinates $(x, y)$, for the orientation $\beta$ of the telemeter, comes from what a general expression of $P^\beta(x,y)$ is:

$$P^\beta(x, y) = \sum_{i=1}^{N-1}\int_{\theta_i}^{\theta_{i+1}}\int_0^\infty g(r, \theta \mid x, y) f_i(r \mid \theta) r dr d\theta + \frac{1}{2}\int_{\Gamma(\beta)}\int_0^\infty g(r, \gamma \mid x, y) r dr d\gamma$$

The preceding results in that:

$$Y(x, y, r, \theta; \lambda \to \mu) = \int_\lambda^\mu \exp\left\{-\frac{1}{2\sigma^2}[r^2 + 2rq(x, y, \theta) + w(x, y)]\right\} r dr$$

Such a calculation of the intermediate probabilities of presence is carried out for each point A of coordinates $(x, y)$, the polar coordinate system thus being modified at each implementation of said calculation.

Advantageously, the axial limit is equal to:

$$D = \frac{\varepsilon}{2\sin\frac{\Delta\theta}{2}}$$

where $\varepsilon$ is a maximum difference desired between two consecutive detection axes;

$\Delta\theta$ is the largest angle between two consecutive detection axes.

This is advantageous, in that, for a given angular resolution of the telemeter 4, any obstacle located at a distance less than the axial limit D in relation to telemeter 4, and of which the transverse dimensions are greater than or equal to the difference $\varepsilon$ will appear on the map of the probability of the presence of an obstacle. In this case, through a clever choice of the difference $\varepsilon$, the appearance of false negatives is reduced, referred to as "empty zones". An example of an empty zone is shown in FIG. 1. In this figure the obstacles 11A and 11B are detected by the telemeter 4, but the obstacle 11C. With an excessively large difference $\varepsilon$, the map of the probability of the presence of an obstacle shows the zone wherein the obstacle 11C is located as a zone that is free of obstacles.

The detection device 8 is further configured to calculate, for any given point of space, the probability of the presence of an obstacle as a function proportional to a weighted sum of the corresponding intermediate probabilities, the weighing factor associated with each intermediate probability being equal to the probability of the corresponding orientation.

For example, for any given point of space, the detection device 6 is configured to calculate the probability of the presence of an obstacle as being equal to:

$$P(x, y) = \frac{\sum_{l=-L}^{L} h(\beta_l) P^{\beta_l}(x, y)}{\sum_{l=-L}^{L} h(\beta_l)}$$

where $P(x,y)$ is the probability of the presence of an obstacle at the point having coordinates $(x, y)$;

$\beta_l$ is the l-th orientation of the telemeter among the $2L+1$ predetermined orientations around the current orientation $\mu_\beta$;

$h(\beta_l)$ is the probability that the telemeter has the orientation $\beta_l$ knowing the current orientation $\mu_\beta$; and $P^{\beta_l}(x,y)$ is the intermediate probability of presence at the point having coordinates $(x,y)$, for the orientation $\beta$ of the telemeter.

Preferably, the orientations $\beta_l$ are chosen in such a way that, for any integer comprised between $-L$ and $L$, the quantities $|\beta_l - \beta_0|$ and $|\beta_{-l} - \beta_0|$ are equal. In other words, the orientations $\beta_l$ and $\beta_{-l}$ are symmetrical around the current orientation $\mu_\beta$.

Figure 5:
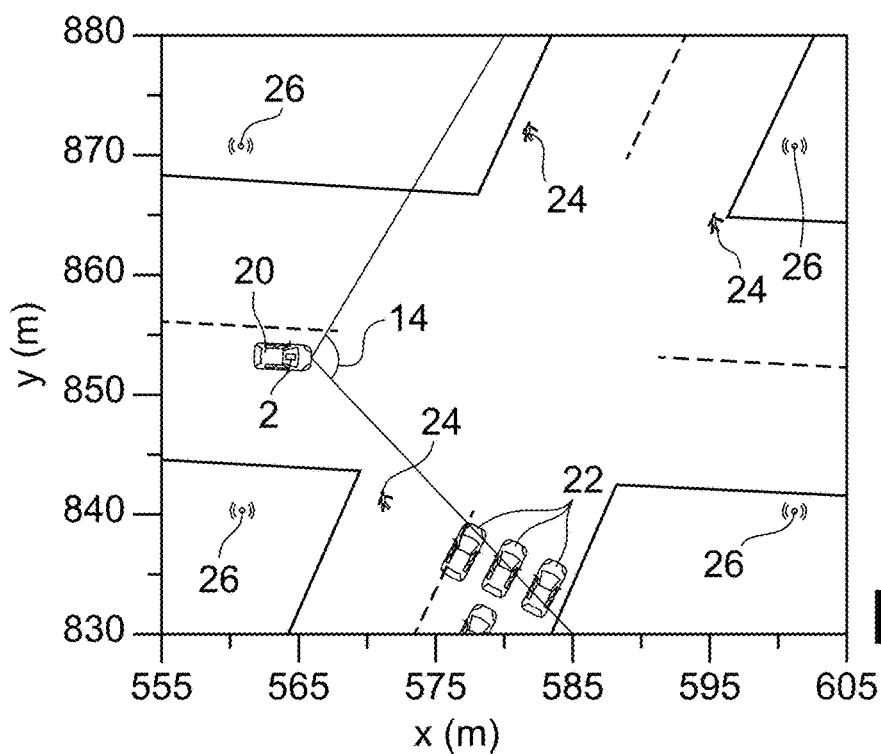
FIG. 5 is a top view of a scene wherein the system for detecting an obstacle of FIG. 1 is implemented.

An example of a scene wherein the detection system 2, embedded in a vehicle 20, is shown in FIG. 5. Such a scene comprises other vehicles 22, pedestrians 24 and posts 26.

Figure 6:
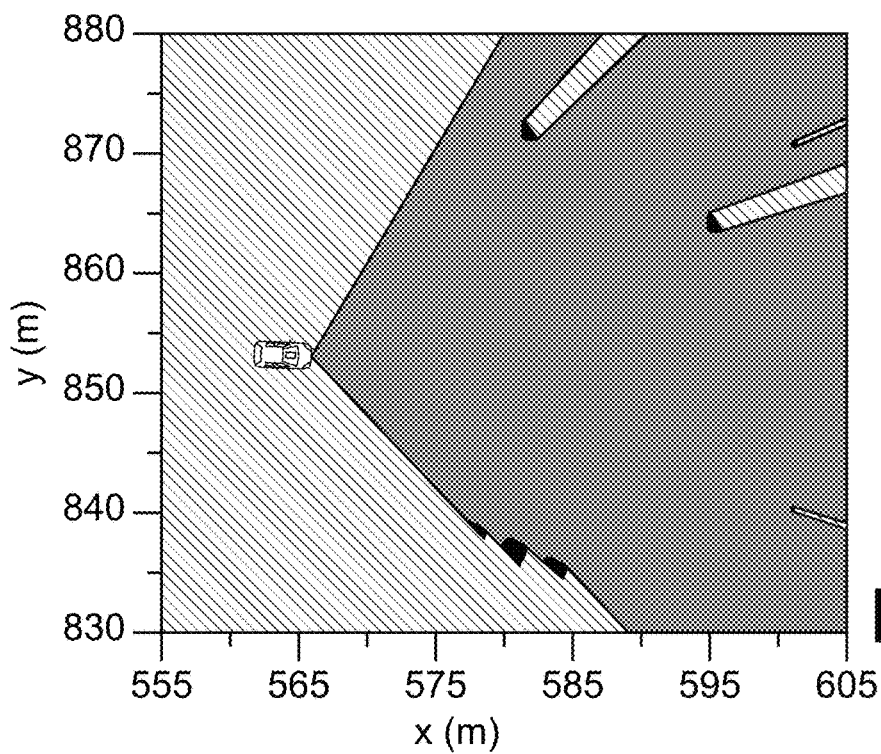
FIG. 6 is a map of the probability of the presence of an obstacle obtained for the scene of FIG. 5, in a horizontal plane of the scene.

The presence probability map obtained for such a scene is shown in FIG. 6. To simplify the comparison with FIG. 5, the vehicle 20 was shown on this presence probability map.

The hashed portions correspond to the unknown regions described hereinabove, wherein the presence of an obstacle is uncertain, either because they are not probed by the telemeter, or because they are masked by an obstacle. Furthermore, among the non-hashed zones:

the darkest portions correspond to the zones wherein the probability of the presence of an obstacle is the highest; and the lightest portions correspond to the zones wherein the probability of the presence of an obstacle is very low, i.e. zones assumed to be empty.

The operation of the detection system 2 shall now be described.

The navigation device 6 determined the current position and the orientation of the telemeter 4. Furthermore, the telemeter 4 delivers the detection signal that represents the position, along each detection axis 10, of the corresponding detection horizon.

The detection device 8 determines, from the detection horizons 9, the position of the detection front 16.

Then, for each point of a predetermined space around the telemeter 4, the detection device 8 calculates the plurality of corresponding intermediate probabilities of presence.

Then, for each point, and from the corresponding intermediate probabilities of presence, the detection device 8 calculates the probability of the presence of an obstacle at this point.

If, in a predetermined zone, the probability of the presence of an obstacle is greater than the predetermined alert threshold, the detection device 8 generates an alert.

The performance of the detection method according to the invention shall now be compared to those of known methods, namely the CBC (Cell by Cell) method, wherein, for each cell of a predetermined grid, it is determined whether each detection axis passes through said cell, and the BBB (Beam By Beam) method, wherein, for each detection axis, the cells that are passed through by said detection axis are determined.

$N_c$ is the total number of cells of the grid, and $N_b$ the number of detection axes. The asymptotic complexity of the CBC method, without taking account of the uncertainties on the position and the orientation of the telemeter, is proportional to $N_c N_b$.

Furthermore, $N_c^b$ is the maximum number of cells passed through by a beam. The asymptotic complexity of the BBB method, without taking account of the uncertainties on the position and the orientation of the telemeter, is proportional to $N_c^b N_b$. Note that the value of $N_b$ is generally less than $N_c$, in such a way that the BBB method generally performs better than the CBC method.

However, taking the position and orientation uncertainties into account greatly increases the complexity of such methods of the prior art, in that it requires an additional merging calculation. Indeed, for the CBC method, a cell is not necessarily passed through by a single detection axis, due to the position and orientation uncertainties described hereinabove. For example, for two different positions (or orientations) of the telemeter, a cell can be passed through by two detection axes, with the probability of the presence of an obstacle in the cell being different for each one of these positions (or orientations). Such a difference requires a merger calculation of these two probabilities.

Similarly, for the BBB method, a detection axis can pass through different sets of cells for each position or orientation of the telemeter, in such a way that the same detection axis can pass through a cell for a given position/orientation and no longer pass through it for another position/orientation.

Accordingly, by setting G as the number of uncertain positions of the telemeter, and 2L+1 the number of uncertain orientations of the latter, the asymptotic complexity of the CBC method is proportional to $N_c N_b G^2 (2L+1)^2$, while the asymptotic complexity of the BBB method is proportional to $N_c^b N_b G^2 (2L+1)^2$.

With regards to the detection method according to the invention, its asymptotic complexity, for the calculation of the intermediate presence probabilities $P^\beta$ at any given point, is proportional to $(2k_F N + 2k_C)$, where $k_F$ is the number of intervals used to numerically approximate the integrals of the relationship (1) according to θ in each one of the N intervals $[\theta_i; \theta_{i+1}]$, and $k_C$ is the number of intervals used to numerically approximate each integral in the angular sector $\Gamma(\beta)$.

This results in that the asymptotic complexity of the calculation of the probability of the presence of an obstacle P at any given point is proportional to $(2k_F N + 2k_C) N_c (2L+1)$.

It should be noted that, due to the linear approximation of the sine and cosine trigonometric functions described previously, this complexity can be further reduced.

By way of example, taking $N_b=361$, $N_c=40,000$, $N_c^b=200$, $G=100$, $L=20$, $N=360$, $k_F=5$ and $k_C=50$, the number of operations per point (or per cell) for calculating the probability of the presence of an obstacle is:

for the CBC method: $6.0648 \cdot 10^9$ operations;
for the BBB method: $3.0342 \cdot 10^7$ operations; and
for the detection method according to the invention: $1.517 \cdot 10^5$ operations.

Thanks to the detection method according to the invention, the complexity of the calculation of the probability of the presence of an obstacle at each point of the map is less than several orders of magnitude than that inherent to the known methods. This results in the possibility of increasing the resolution of the map without any substantial detriment for the calculation times.

As indicated hereinabove, according to an alternative, the detection system 2 is able to determine a three-dimensional map of the probability of the presence of an obstacle.

In this case, the telemeter 4 is advantageously configured to have detection axes that define a plurality of webs not taken together.

Furthermore, the navigation device 6 is configured to determine the three coordinates of the telemeter 4 in space, as well as its attitudes (pitch, yaw, roll). In this case, the uncertainty models are extended to all of the additional data measured by the navigation device 6.

Furthermore, the detection device 8 is configured to determine the position of the detection front 16 by implementing, by a polyptoton (case with a linear interpolation), or by an interpolation on a variety.

Again as an alternative, the detection system 2 comprises a plurality of telemeters 4. In this case, the detection device 8 is configured to merge the data calculated from the detection signals received from each telemeter 4 in order to determine the map of the probability of the presence of an obstacle.

The invention claimed is:

1. Computer-implemented method for detecting an obstacle, the method including, for at least one telemeter having a plurality of detection axes and configured to deliver a detection signal indicative of a position, along each detection axis, of a detection horizon corresponding to the detection axis, the steps of:

calculating, for each point of a space around the telemeter, from a current position of the telemeter, an uncertainty model of a plurality of corresponding intermediate probabilities of presence of-the position of the telemeter and the detection signal, each intermediate probability of presence being associated with a respective orientation of the telemeter among a plurality of predetermined orientations around a current orientation of the telemeter, each orientation being certain;

for each point of space, calculating a probability of the presence of an obstacle from each corresponding intermediate probability of presence and from an uncertainty model on the orientation of the telemeter; and generating an alert if the probability of the presence of an obstacle in a predetermined zone with respect to the telemeter is greater than or equal to a predetermined alert threshold.

2. Method according to claim 1, wherein, for any given point of space, the probability of the presence of an obstacle is proportional to a weighted sum of the corresponding intermediate probabilities, a weighting factor associated with each intermediate probability being equal to a probability of the corresponding orientation.

3. Method according to claim 2, wherein, for any given point of space, the probability of the presence of an obstacle is equal to:

$$P(x, y) = \frac{\sum_{l=-L}^{L} h(\beta_l) P^{\beta_l}(x, y)}{\sum_{l=-L}^{L} h(\beta_l)}$$

where P(x, y) is the probability of the presence of an obstacle at the point having coordinates (x, y);

$\beta_l$ is an l-th orientation of the telemeter among 2L+1 predetermined orientations around the current orientation;

$h(\beta_l)$ is a probability that the telemeter has the orientation $\beta_l$ knowing the current orientation; and $P^{\beta_l}(x,y)$ is the intermediate probability of presence at the point having coordinates (x,y), for the orientation $\beta_l$ of the telemeter.

4. Method according to claim 1, wherein the uncertainty model on the orientation of the telemeter implements the law of probability:

$$h(\beta) = \begin{cases} \dfrac{1}{\sigma_\beta\sqrt{2\pi}\,\operatorname{erf}\left(\dfrac{\pi}{\sqrt{2}\,\sigma_\beta}\right)} \exp\left[-\dfrac{1}{2\sigma_\beta^2}(\beta-\mu_\beta)^2\right], & \text{if } -\pi \le \beta < \pi \\ 0, & \text{otherwise} \end{cases}$$

where $h(\beta)$ is the probability that the telemeter has any given orientation $\beta$;

$\sigma_\beta$ is a standard deviation of a measurement of the orientation of the telemeter;

$\mu_\beta$ is the current orientation of the telemeter;

"erf" is the error function; and

"exp" is the exponential function.

5. Method according to claim 1, wherein the detection axes come from a same emission point of the telemeter, the detection axes being contained in an angular detection sector, the method comprising estimating the position of each point of a detection front defined in the angular detection sector and intercepting each detection horizon.

6. Method according to claim 5, implementing a detection model of the form:

$$f_i(r\mid\theta) = \begin{cases} u(r-d(\theta)+\tau) - \dfrac{1}{2}u(r-d(\theta)-\tau), & \text{if } d_i \text{ or/and } d_{i+1} < d_R - \tau \\ \dfrac{1}{2}u(r-d_R+\tau), & \text{if } d_i \text{ and } d_{i+1} \ge d_R - \tau \end{cases}$$

where $f_r(r\mid\theta)$ is a probability of detecting an obstacle at a distance r and according to an angular coordinate $\theta$ comprised between angles $\theta_i$ and $\theta_{i+1}$ associated with two successive detection axes, the position and the orientation of the telemeter being certain;

$d_i$, respectively $d_{i+1}$, is the position, along the detection axis associated with the angle $\theta_i$, respectively $\theta_{i+1}$, of the corresponding detection horizon;

$d_R$ is a range of the telemeter;

$\tau$ is an uncertainty on the measurement, by the telemeter, of the position of the detection horizon;

"u" is the unit step function; and $d(\theta)$ is the position of the detection front for the angular coordinate $\theta$.

7. Method according to claim 1, wherein the intermediate probability of presence at any given point, for a given orientation of the telemeter, is evaluated from the expression:

$$P^\beta(x,y) = \sum_{i\in F_\ge} A_i(x,y) + \sum_{i\in F_<} B_i(x,y) + C(x,y)$$

where $P^\beta(x,y)$ is the intermediate probability of presence at the point having coordinates (x,y), for the orientation $\beta$ of the telemeter;

$F_\ge$ is a set of successive pairs of detection axes, associated respectively with angles $\theta_i$ and $\theta_{i+1}$, for which the positions of the respective detection horizons $d_i$ and $d_{i+1}$ are simultaneously greater than or equal to $d_R-\tau$;

$F_<$ is a set of successive pairs of detection axes, associated respectively with angles $\theta_i$ and $\theta_{i+1}$, for which the position of at least one of the respective detection horizons $d_i$ and $d_{i+1}$ is strictly less than $d_R-\tau$;

$A_i(x,y)$ is a function defined as:

$$A_i(x,y) = \frac{1}{4\pi\sigma^2} \int_{\theta_i}^{\theta_{i+1}} Y(x,y,r,\theta \mid d_R - \tau \to D)d\theta$$

$B_i(x,y)$ is a function defined as:

$$B_i(x,y) = \frac{1}{2\pi\sigma^2}$$

$$\int_{\theta_i}^{\theta_{i+1}} \left( Y(x,y,r,\theta; d(\theta)-\tau \to d(\theta)+\tau) + \frac{1}{2}Y(x,y,r,\theta; d(\theta)+\tau \to D) \right) d\theta$$

$C(x,y)$ is a function defined as:

$$C(x,y) = \frac{1}{4\pi\sigma^2} \int_{\Gamma(\beta)} Y(x,y,r,\theta \mid 0 \to D)d\theta$$

where:

$Y(x,y,r,\theta; \lambda \to \mu) =$ $I_1(x,y,\mu,\theta) - I_1(x,y,\lambda,\theta) + I_2(x,y,\mu,\theta) - I_2(x,y,\lambda,\theta)$ with:

$$I_1(x,y,r,\theta) = -\sigma^2 \exp\left\{-\frac{1}{2\sigma^2}\left[r^2 + 2rq(x,y,\theta) + w(x,y)\right]\right\}$$

and:

$I_2(x,y,r,\theta) =$ $$-\frac{\sqrt{2\pi}}{2}\sigma q(x,y,\theta)\operatorname{erf}\left[\frac{r+q(x,y,\theta)}{\sqrt{2}\sigma}\right]\exp\left\{-\frac{1}{2\sigma^2}m(x,y,\theta)^2\right\}$$

$\sigma$ is a standard deviation of a measurement of the position of the telemeter;

D is a predetermined axial limit;

$w(x,y)$ is a quantity equal to $(x-\mu_x)^2+(y-\mu_y)^2$ $q(x,y,\theta)$ is a quantity equal to $(x-\mu_x)\cos\theta+(y-\mu_y)\sin\theta$ $m(x,y,\theta)$ is a quantity equal to $(x-\mu_x)\sin\theta-(y-\mu_y)\cos\theta$ $(\mu_x,\mu_y)$ are coordinates that represent the current position of the telemeter; and $\Gamma(\beta)$ is a complementary angular sector of an angular detection sector containing the detection axes of the telemeter, the telemeter having the orientation $\beta$.

8. Method according to claim 7, wherein the axial limit is equal to:

$$D = \frac{\varepsilon}{2\sin\dfrac{\Delta\theta}{2}}$$

where $\varepsilon$ is a desired maximum difference between two consecutive detection axes;

Δθ is a largest angle between two consecutive detection axes.

9. Non-transitory computer-readable medium comprising program code instructions which, when executed by a computer, implement the detection method according to claim 1.

10. Device for detecting an obstacle comprising a microprocessor configured to, for at least one telemeter having a plurality of detection axes and configured to deliver a detection signal indicative of a position, along each detection axis, of a detection horizon corresponding to the detection axis:
- calculate, for each point of a space around the telemeter, from a current position of the telemeter, an uncertainty model of a plurality of corresponding intermediate probabilities of presence of the position of the telemeter and the detection signal, each intermediate probability of presence being associated with a respective orientation of the telemeter among a plurality of predetermined orientations around a current orientation of the telemeter, each orientation being certain;
- for each point of space, calculate a probability of the presence of an obstacle from each corresponding intermediate probability of presence and from an uncertainty model on the orientation of the telemeter; and
- generate an alert if the probability of the presence of an obstacle in a predetermined zone with respect to the telemeter is greater than or equal to a predetermined alert threshold.

11. System for detecting an obstacle comprising a device for detecting an obstacle according to claim 10, a telemeter and a navigation device,
- the telemeter being associated with a plurality of detection axes and being configured to deliver the detection signal indicative of the position, along each detection axis, of the detection horizon corresponding to the detection axis,
- the navigation device being configured to determine the current position and the current orientation of the telemeter, and
- the detection device being connected to the telemeter to receive the detection signal and to the navigation device to receive the current position and the current orientation of the telemeter.

12. Vehicle comprising a system for detecting an obstacle according to claim 11, the detection axes of the telemeter being directed towards an outside of the vehicle.

* * * * *